July 20, 1943.　　　R. H. SCHROHE ET AL　　　2,324,729
SEALING COMPOUND
Filed March 12, 1941
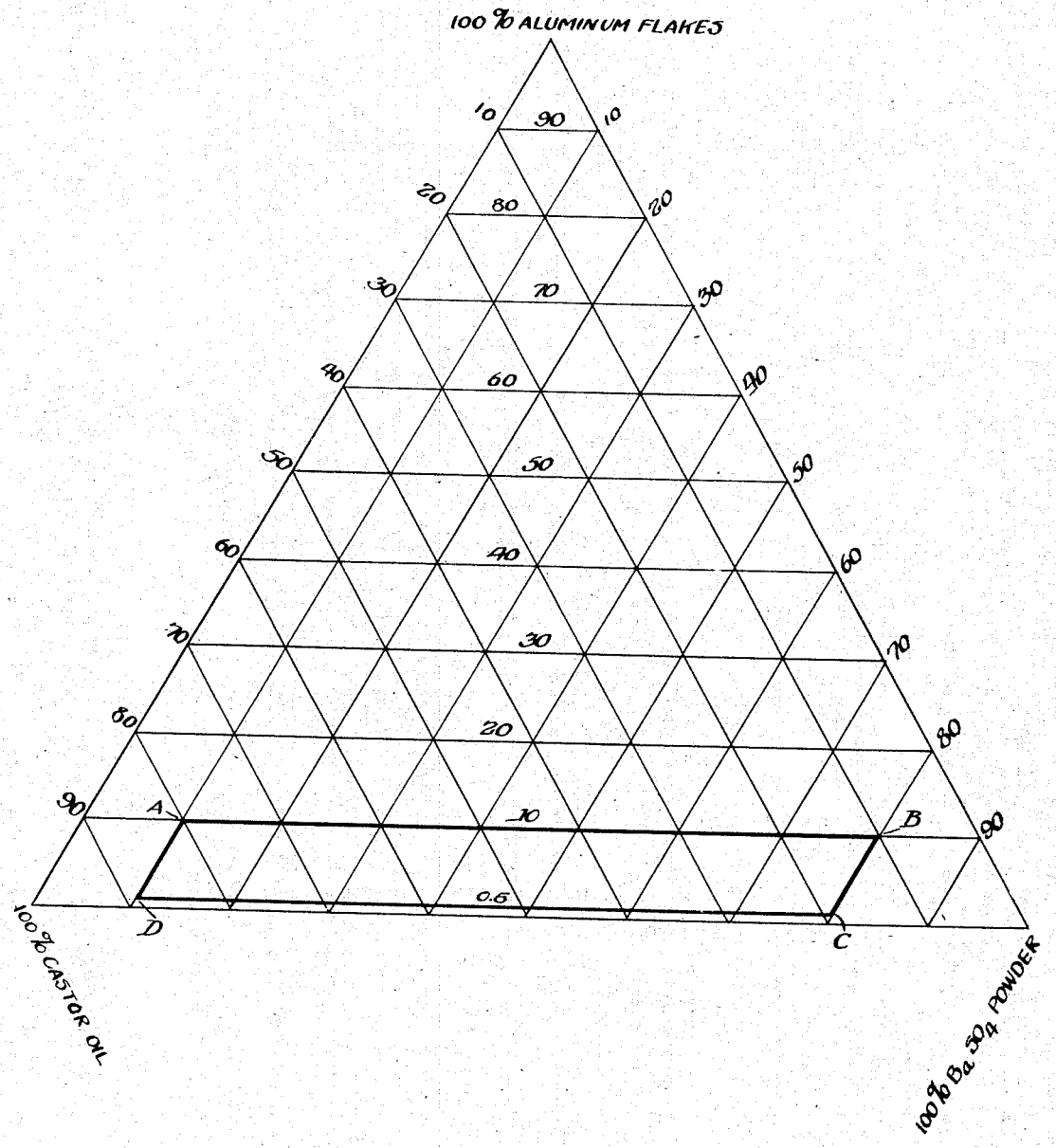
Inventors:
Robert H. Schrohe,
Robert W. Manuel,
By: Joseph O. Lange
Atty.

Patented July 20, 1943

2,324,729

UNITED STATES PATENT OFFICE 2,324,729

SEALING COMPOUND

Robert H. Schrohe and Robert W. Manuel, Chicago, Ill., assignors to Crane Co., Chicago, Ill., a corporation of Illinois Application March 12, 1941, Serial No. 382,950

3 Claims. (Cl. 106—266)

Our invention relates broadly to fluid sealing materials and more particularly to a pipe thread sealing compound which is made up of a suspension of chemically inert and insoluble particles in a viscuous, non-drying oil.

A primary object of our invention lies in the provision of a sealing cement suitable for use with chrome-nickel stainless steel, for example, in which threaded joints and the like may be assembled in leak-proof relation without the usual galling or otherwise defacing of the threaded surfaces.

Another object lies in the provision of a non-hardening pipe joint cement having excellent lubricating qualities and in which the bonding or carrying ingredient is preferably a highly adhesive vegetable oil.

A still further purpose of our invention is to provide a thread compound having fluid sealing properties even when used with relatively coarse or unevenly machined threads or else with threaded material which, by reason of the nature of the material of which it is composed, tends to seize and gall when assembled under high compressive loads.

Another object is the provision of a combined pipe thread lubricant and fluid seal which consists respectively of a mixture of blown castor oil, a powdered or finely crystalline ingredient and a flake-like material.

Still another object lies in the provision of a novel thread sealing lubricant which is especially suitable for use on stainless steels of the 18 per cent chrome and 8 per cent nickel class and in which the lubricating medium will not deteriorate under any of the common services to which 18–8 pipe and fittings are subjected.

In the annexed drawing a triangular diagram is shown graphically describing the proportions of preferred ingredients which are included in preferred compositions of our invention as plotted with triangular coordinates.

The method of plotting the proportions of the ingredients in the composition is that proposed by Gibbs, Trans., Conn. Acad. 1876, vol. 3, page 176. In this method the corners of the triangle represent 100 per cent of each of the ingredients and the relative proportions and percentages of the three ingredients in any ternary mixture of them are read along the perpendicular line drawn from the side of the triangle opposite the corner representing the ingredients to the point in the triangle representing the mixture or composition.

For purposes of illustration, and therefore not to be construed as a limitation, description will be made of our invention as it is advantageously applied to stainless or chrome nickel steel threaded pipe joints. The particular material is chosen for illustration because, of all of the commercial piping materials, this presents by far the most difficult in making a threaded leak-proof joint. The poor bearing characteristics of 18–8 stainless steels cause them to have very poor resistance to seizing and galling when moved in forcible contact with another metal or with one another. As a consequence, smooth threads are difficult to form and when assembled together to make a joint, the metallic threaded surfaces must at all times be maintained out of contact or else they seize and a leaky joint will result. To our knowledge, no one previously has made a joint-sealing compound suitable for use on chrome-nickel threaded assemblies, and this has been substantiated by the limited practical use of threaded joints made in this material. The majority of chrome-nickel alloy pipe joints are either soldered, as in the liquid foods industries, or else welded, as in the corrosive chemicals industries. In general, the main application of threaded joints on chrome-nickel alloy pipe and fittings is confined to highly corrosive services where a welded joint would have a low corrosion resistance as a result of the application of welding temperatures to the material. We believe that much of this limited utilization of threaded chrome-nickel alloy joints is due to the unavailability of a suitable cement which will prevent the threaded surfaces from galling when assembled and disassembled.

To be satisfactory and successful, a pipe joint cement for such services must primarily have a high lubricating value and be strongly adherent to the respective metallic bodies that are to be joined, in order to maintain the raw metallic surfaces in spaced-apart relation to prevent seizing, and secondarily, must have a high solvent resistance to many liquid food products and chemical reagents, both hot and cold. Among these may be listed fruit and vegetable juices of all kinds, milk, acids, alkalis, steam, gasoline, kerosene, fuel oil, lubricating oil and mineral oils in general.

Because of these service conditions the sealing material employed must have special properties, among which the following may be enumerated: (1) the material must be highly adhesive to metallic surfaces in order that there may be a binding effect between them; (2) the material must have a high film strength to maintain the metallic surfaces out of contact and also to provide the desirable lubrication; (3) the material must be non-drying and non-hardening so that the joint may be dismantled without galling or otherwise damaging the contacting surfaces or those in slidable relation; (4) it must be capable of blocking off minute avenues of leakage which may exist between roughly machined threaded surfaces; (5) the material must be of such a nature that a slight amount of oil which may exist initially on the threaded surfaces will not lower its efficiency; (6) it must be of such chemically inert and solvent resistant character that its effective ingredients will not be eliminated under continued use; (7) it must be of such physical condition as to be readily applied to the entire surfaces which are to be treated by menas of a brush, spray, dipping or any other suitable method; and (8) in the event that the material is to be applied by spraying, it must be soluble in a commercial solvent material in order to be thinned to the proper consistency. These requirements are of course not exclusive of the other usual requirements which are well known to those familiar with sealing materials of this general classification.

It is evident, then, that if any of the ingredients which are desired to make a pressure-tight joint in the first instance are leached out by solvent action of the fluid within the pipe, deleterious results will be obtained to the extent that the joint may leak and the threaded surfaces may gall when unthreading is attempted.

The sealing compound with which our invention is particularly concerned includes the combination of three ingredients, each of which contributes its own specific function in producing a fluid-tight threaded joint. Generally speaking, we have combined (1) a lubricant having strong adhesion to metallic surfaces; (2) a flaky material; and (3) a powdered or finely crystalline material.

A lubricant with which we have had much success is castor oil, both the raw and blown varieties. By "blown" castor oil we mean that product which is obtained by the oxidation or polymerization of ordinary raw castor oil irrespective of the manner or the degree of oxidation or polymerization. Castor oil and especially blown castor oil has a great number of chemical and physical properties which make it ideally suited for the application herein described. Among these are (1) high viscosity; (2) high film strength; (3) high resistance to chemical change on aging (especially true for the blown variety due to its already-oxygen-saturated state); (4) strong affinity for metallic surfaces; (5) properties not materially affected by small proportions of dissolved mineral oil or grease which may have been initially present on threaded surfaces. The purpose of the oil in our mixture is two-fold, in that it acts (1) as a vehicle for the other two ingredients, and (2) as a non-drying, non-hardening, strongly adherent lubricant which keeps the metallic surfaces out of contact.

The second or flaky ingredient mentioned above has the purpose of blocking off any avenues of fluid escape which may exist in the threads by reason of improper machining or otherwise. Threads of chrome-nickel steel alloys as already described, are particularly difficult to form smoothly. Finely divided aluminum flakes have been used successfully, although similar results would be obtained with any chemically resistant, finely divided flake-like material, mica flakes for instance. Specifically, we have had favorable results with flake aluminum of the following grain size: 140 mesh and finer, 65% of which will pass through a 300 mesh screen.

The third and last of the mentioned ingredients may be any powdered or finely crystalline material which will fill the minute interstices between the flake material and thus seal off finally even the tiniest channels of leakage which may exist between the threaded surfaces around the relatively larger flaky elements. While we give powdered barium sulphate as an example herein this must be understood to be only by way of illustration, since any other chemically inert, insoluble powdery substance may also be used.

We have found that oil by itself, regardless of its high viscosity or highly adherent properties, cannot be depended upon to make a threaded joint leak-proof, and neither are satisfactory results obtainable by combining the oil with either the flaky ingredients or powdery ingredients. All three must be combined for the utmost all around utility; the oil acting as lubricant and vehicle; the flaky material acting to physically block off or dam the larger avenues of leakage; and the smaller powdery particles functioning to block off the tiniest avenues of leakage. With only the oil and powdery filler constituent the whole mixture may be forced by internal pressure out the avenues of leakage past the threads; with only the oil and the flake-like constituent, the oil may be forced out around the individual flakes.

No special process need be employed in mixing our compound except that it is obviously important that the materials be blended with reasonable intimacy. It may be mixed cold by ordinary stirring or pouring methods. Proportions and materials which we have found best are as follows:

An inert powdery material, such as barium sulphate, 10 to 80 per cent by weight
An inert flaky material, such as powdered aluminum, ½ to 10 per cent by weight
An inert adhesive, non-drying oil, such as castor oil, the remainder In the accompanying triangular graph, the area ABCD represents compositions of sealing mixtures containing castor oil, barium sulphate, and aluminum powder in the proportions which function according to our invention as hereinbefore described. Beyond the boundaries of the area ABCD, mixtures are obtained which exhibit entirely different properties because they have either too much or too little of one or the other of the ingredients. If too much barium sulphate or aluminum powder is used, the paste is too thick to be applied evenly and difficulty will be experienced in causing the material to flow completely into the fissures in the threads; if too little is used, the condition of pure oil will be approached and accordingly the joint will leak.

While we have mentioned specific chemicals as ingredients in our novel sealing compound we again point out that they are given only by way of illustration and that our compound consists broadly of the combination of these three materials: any viscous, non-drying, non-hardening liquid lubricant; any finely divided flaky ingredient, and any powdery or finely crystalline material, all three being difficultly soluble in the common chemicals which are ordinarily conveyed through metal pipes of the type described.

Neither do we wish to limit the use of our material to stainless steel threaded joints as it is equally applicable to threaded joints made of any other material and may also be used advantageously in joints other than those employing threads. Since the particular chemicals which we have named specifically have been mentioned only for the sake of more clearly describing our invention, we desire to be limited only within the scope of the appended claims.

We claim:

1. A non-hardening cement of the character described, consisting of a ternary mixture of 0.5 to 10 per cent of finely divided flake aluminum, 10 to 80 per cent of barium sulphate powder, and 10 to 89½ per cent of blown castor oil.

2. In a sealing cement, the combination consisting of a ternary mixture of castor oil, powdered barium sulphate, and finely divided aluminum, the barium sulphate and the castor oil being in approximately equal quantities, and the finely divided aluminum comprising ½ to 10 percent by weight of the whole.

3. In a non-hardening cement, the combination consisting of a ternary mixture of 0.5 to 10 per cent of finely divided flake aluminum, 10 to 80 per cent of barium sulphate powder, the remainder being ordinary raw castor oil.

ROBERT H. SCHROHE.
ROBERT W. MANUEL.